United States Patent
Hahn

(10) Patent No.: US 7,092,033 B2
(45) Date of Patent: Aug. 15, 2006

(54) GRADIENT-AIDED APPARATUS AND METHOD FOR PIXEL INTERPOLATION

(75) Inventor: Marko Hahn, Munich (DE)

(73) Assignee: MICRONAS GmbH, Freiburg (DE)

( * ) Notice: Subject to any disclaimer, the term of this patent is extended or adjusted under 35 U.S.C. 154(b) by 455 days.

(21) Appl. No.: 10/636,307

(22) Filed: Aug. 7, 2003

(65) Prior Publication Data

US 2004/0066467 A1    Apr. 8, 2004

(30) Foreign Application Priority Data

Aug. 7, 2002   (DE)   ................. 102 36 204

(51) Int. Cl.
*H04N 7/01* (2006.01)
(52) U.S. Cl. ...................... 348/458; 348/441
(58) Field of Classification Search ............. 348/441, 348/448, 451, 452, 458, 459, 619; 382/298, 382/300; H04N 7/01, 11/20
See application file for complete search history.

(56) References Cited

U.S. PATENT DOCUMENTS

| 6,268,886 | B1 | 7/2001 | Choi ........................ 348/448 |
| 6,281,875 | B1 | 8/2001 | Zhao et al. ................ 345/136 |
| 6,345,106 | B1 * | 2/2002 | Borer ........................ 382/107 |
| 6,731,342 | B1 * | 5/2004 | Shin et al. .................. 348/452 |

FOREIGN PATENT DOCUMENTS

EP    0 551 040    7/1993

OTHER PUBLICATIONS

Kuo et al., "Adaptive Edge-Based Interpolation for Scanning Rate Conversion", 1996 IEEE International Conference on Acoustics, Speech, and Signal Processing Proceedings. (ICASSP). Atlanta, May 7-10, 1996, New York, IEEE, US, vol. 4 Conf. 21, (May 7, 1996), pp. 2120-2123, XP000681662 ISBN: 0-7803-3193-1.

Doyle et al. "Progressive Scan Conversion Using Edge Information" Signal Processing of HDTV, 2. Turin, Aug. 30-Sep. 1, 1989, Proceedings of the International Workshop on HDTV, Amsterdam, Elsevier, NL, vol. Workshop 3, Aug. 30, 1989, pp. 711-721, XP000215289.

Haan et al. "Deinterlacing—An Overview" Proceedings of the IEEE, IEEE. New York, US, vol. 86, No. 9, Sep. 1998, pp. 1839-1857, XP000850198 ISSN:0018-9219.

Darwish et al., "Adaptive Resampling Algorithm for Image Zooming", IEEE Proc.—Vis. Image signal Process, vol. 144, No. 4, Aug. 1997.

Kim et al., "An Image Interpolator with Image Improvement for LCD Controller", IEEE Transactions on Consumer Electronics, vol. 47, No. 2, pp. 263-271, May 2001.

* cited by examiner

*Primary Examiner*—Sherrie Hsia
(74) *Attorney, Agent, or Firm*—O'Shea, Getz & Kosakowski, P.C.

(57) ABSTRACT

The present invention relates to interpolating a pixel in an image that includes a number of pixels arrayed in matrix-like fashion, to each of which a video information value is assigned, in which method a gradient for the video information value is determined at, at least, a first and a second pixel adjacent to the pixel to be interpolated and, in the formation of the interpolated video information value, a greater weight is accorded to the video information value of the adjacent pixels whose associated gradient is smaller.

13 Claims, 3 Drawing Sheets

GRADIENT-AIDED APPARATUS AND METHOD FOR PIXEL INTERPOLATION

BACKGROUND OF THE INVENTION

The present invention relates to video image processing, and in particular to an apparatus and method for interpolating a pixel within an image arranged as an array of pixels.

Analog television signals contain fields transmitted in temporal succession, wherein the fields are constructed linewise. A field comprising the even-numbered lines and a field comprising the odd-numbered lines are transmitted alternately.

A variety of methods are known for generating a frame from such a field. In the simplest case, the lines of the field are duplicated so that the items of video information of the pixels of an intermediate line between two lines of a field are specified by the video information values of the image line lying above the intermediate line or below the intermediate line. In this procedure, however, in which adjacent lines are identical two by two, edges running diagonally in the image have a graduated or stairstep appearance.

In another known method, the video information value associated with a pixel of an intermediate line is determined by taking the average of the video information values of the pixels lying vertically above and vertically below the pixel to be interpolated and selecting the average as the video information value of the pixel of the intermediate line. This method has the disadvantage that vertical edges have an indistinct appearance because of the insertion of a line containing the averages.

Therefore, there is a need for a pixel interpolation apparatus and method that is simple to implement and is not constrained by the above-cited disadvantages.

SUMMARY OF THE INVENTION

Interpolating a pixel in an image exhibiting a number of pixels arrayed in matrix-like fashion, to each of which there is assigned a video information value, comprises the selection of at least one first pixel to which a first video information value is assigned and a second pixel to which a second video information value is assigned, which points lie adjacent to the pixel to be interpolated, the pixel to be interpolated lying between the first pixel and the second pixel in an interpolation direction. At the first pixel a gradient of the first video information value is determined in a gradient direction that deviates from the interpolation direction. At the second pixel a gradient of the associated video information value is also determined in the gradient direction. A video information value of the pixel to be interpolated is then determined from the at least one first video information value and the at least one second video information value, a greater weight being accorded to the video information value from the group with the first video information value and the second video information value of the first pixel and the second pixel whose associated gradient is smaller in absolute value.

Items of video information flow from the interpolation direction into the determination of the video information value of a pixel to be interpolated, in that there are selected at least two pixels arrayed adjacent to the pixel to be interpolated in the interpolation direction, to which pixels video information values are assigned.

Items of video information likewise flow from the gradient direction, which does not coincide with the interpolation direction, into the determination of the video information value to be interpolated, in that a greater weight is accorded to the video information value of the pixel lying adjacent in the interpolation direction whose associated gradient is smaller in absolute value.

In one embodiment, the first video information value is multiplied by a first weighting factor and the second video information value is multiplied by a second weighting factor and the weighted video information values are added wherein, the sum of the weighting factors is equal to unity. In the simplest case, a weighting factor of unity is taken for the video information value whose gradient is smaller in absolute value, while a weighting factor of zero is taken for the other video information value.

The interpolation direction preferably runs perpendicularly to the gradient direction. The interpolation direction, for example, runs perpendicularly in a field constructed linewise in which video information values of intermediate lines are to be interpolated, so that, at each pixel to be interpolated in an intermediate line, a pixel of an image line lying above the intermediate line is selected and a pixel of an image line lying below the intermediate line is selected. The determination of a gradient of the video information value of a selected pixel then runs linewise perpendicularly to the interpolation direction, that is, for the determination of the gradient associated with a video information value of a pixel, pixels lying in the line adjacent to the given pixel are selected.

If the gradients of the video information values of the first pixel and the second pixel are equal, then a choice can be made between various ways of proceeding in order to determine the video information value of the intermediate point to be interpolated. In a first embodiment for the case where the gradients of the video information values of the first pixel and the second pixel are equal, the average of the first video information value and the second video information value is selected as the video information value of the pixel to be interpolated.

In a second embodiment where the gradients are equal, the video information value of the intermediate point to be interpolated is determined by more-complex methods, recourse being had to this video information value only when the gradients of the video information values of the first pixel and the second pixel coincide. Such a more-complex method for determining the video information value to be interpolated provides, for example in the case of intermediate line interpolation of a video field, for using a third pixel besides the first pixel and the second pixel, which third pixel originates in a temporally succeeding field and lies, in the succeeding field, at the same image position as the pixel to be interpolated in the field with the intermediate line to be interpolated. The video information values of these three pixels can be accorded suitable weights and added together in order to determine the video information value to be interpolated, the video information values being weighted such that the video information value of the pixel to be interpolated lies in an interval specified by the first video information value and the second video information value.

Any conventional methods of gradient determination can be applied to determining the gradient of a video information value at a given pixel.

In the simplest case, the difference between the video information values of two pixels lying adjacent to the given pixel in the gradient direction is determined and the absolute value of this difference is employed as a measure for the gradient. Besides determining the absolute value, the difference determined can also be squared or raised to the power of any positive number greater than zero.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
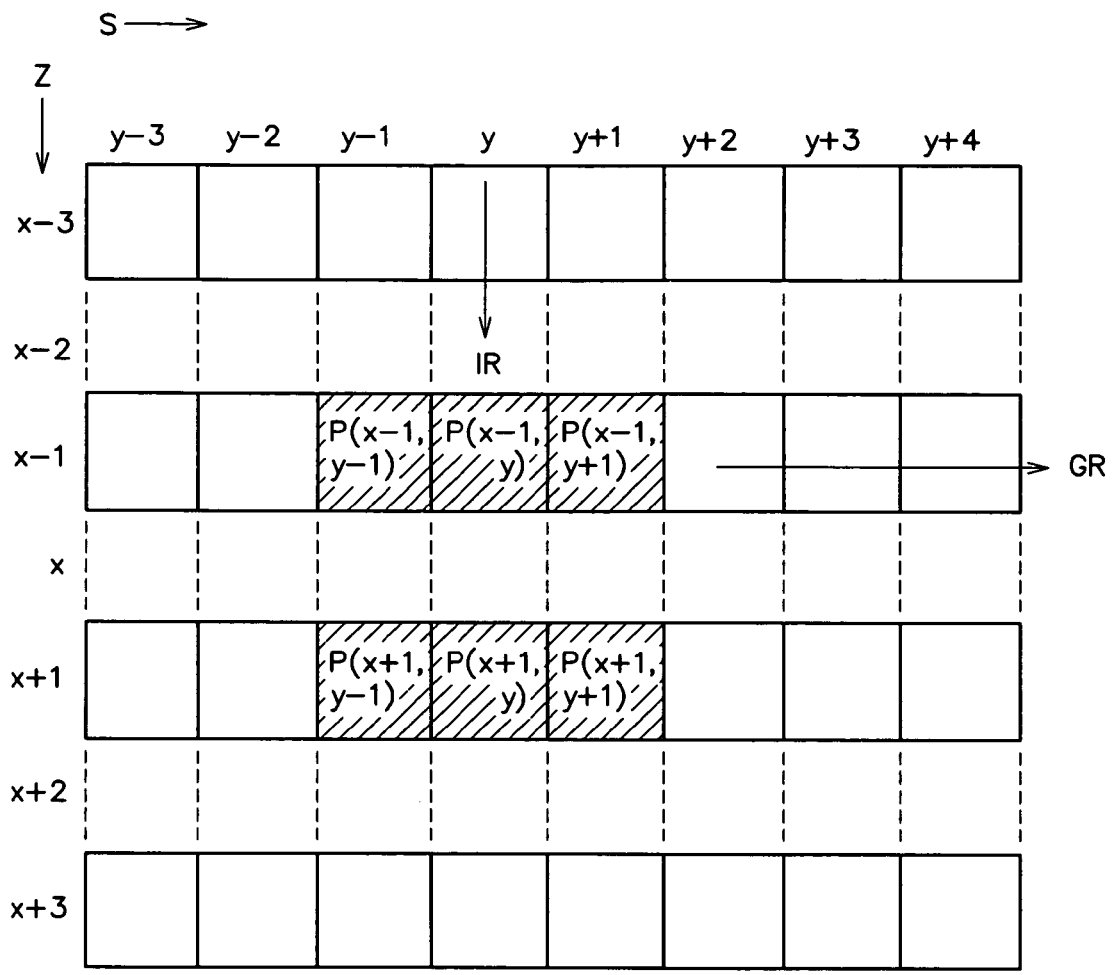
FIG. 1 shows schematically a portion of an image constructed linewise.

FIG. 1 shows schematically a portion of an image constructed linewise, for example a video field in which video information values exist only at every other line, the pixels of these lines being visualized by boxes outlined by solid lines, while the pixels of intermediate lines are depicted by dashed lines.

P(x,y) denotes a pixel of an intermediate line whose video information value is interpolated with the method according to the invention as explained below. The first step to this end is to select an interpolation direction IR, which in the exemplary embodiment runs in the direction of the columns or perpendicularly to the lines of the matrix-like image. Adjacent to the pixel P(x,y) to be interpolated in the interpolation direction IR a first pixel P(x+1,y) and a second pixel P(x−1,y) are chosen, the pixel P(x,y) to be interpolated lying between the first pixel P(x+1,y) and the second pixel P(x−1,y) in the interpolation direction IR.

In the exemplary embodiment, the first pixel P(x+1,y) lies in the image line below the intermediate line with the pixel P(x,y) to be interpolated. The second pixel P(x−1,y) lies in an image line above the intermediate line with the pixel P(x,y) to be interpolated.

Assigned to each of these pixels is a video information value, for example a brightness value, a contrast value or a color intensity value, which is denoted hereinafter by L(.).

A gradient for the video information value L(x+1,y) of the first pixel P(x+1,y) and a gradient for the video information value L(x−1,y) of the second pixel P(x−1,y) are determined in a gradient direction GR. The gradient direction GR in the exemplary embodiment runs within the lines perpendicularly to the interpolation direction IR. The gradient of the first video information value L(x+1,y) is determined for example by taking the difference between the video information values L(x+1,y−1) and L(x+1,y−1) of the pixels P(x+1,y−1), P(x+1,y+1) adjacent to the first pixel P(x+1,y) in line x+1. Correspondingly, the gradient of the video information value L(x−1,y) of the second pixel is formed by taking the difference between the video information values L(x−1,y−1), L(x−1,y+1) of the pixels P(x−1,y−1), P(x−1,y+1) adjacent to the first pixel P(x−1,y) in line x−1 and determining the absolute value of this difference. Thus:

$$\text{gradient } (x-1,y) = |L(x-1,y-1) - L(x-1,y+1)|$$

$$\text{gradient } (x+1,y) = |L(x+1,y-1) - L(x+1,y+1)| \quad (1)$$

Here expression gradient(.) denotes the gradient of the video information value at the pixel in question. In a further embodiment of the invention, a different metric is employed for determining the gradient, the square of the difference between the video information values of the pixels adjacent in the line being employed, so that:

$$\text{gradient } (x-1,y) = ((L(x-1,y-1) - L(x-1,y+1))^2$$

$$\text{gradient } (x+1,y) = ((L(x+1,y-1) - L(x+1,y+1))^2 \quad (2)$$

Of course, any further positive powers of the absolute value of the above-discussed difference between the video information values of two adjacent pixels can be used to determine the gradient.

The technique of the invention now provides for comparing the gradient gradient(x+1,y) determined at the first pixel P(x+1,y) with the gradient gradient(x−1,y) determined for the second pixel P(x−1,y) and determining the video information value L(x,y) to be interpolated by using the first video information value L(x+1,y) and using the second video information value L(x−1,y), a greater weight being accorded to the video information value whose associated gradient is smaller. The determination of the interpolated video information value L(x,y) can be mathematically represented as follows:

$$L(x,y) = k1 \cdot L(x+1,y) + k2 \cdot L(x-1,y)$$

where $k1 + k2 = 1$ and $0 \leq k1, k2 \leq 1$ \quad (3)

Here k1, k2 denote the weighting factors with which the first and second video information values L(x+1,y) and L(x−1,y) respectively are weighted, which weighting factors depend on the relationship of the gradients to one another, the weighting factor k1 or k2 being larger whose associated gradient is smaller in comparison with the other gradient.

In one embodiment of the invention, the weighting factor of the video information value whose associated gradient is smaller than the gradient of the other video information value is set equal to unity while the other weighting factor is set equal to zero, such that:

$$k1 = 1 \text{ and } k2 = 0 \text{ if gradient } (x-1,y) > \text{gradient } (x+1,y)$$

$$k1 = 0 \text{ and } k2 = 1 \text{ if gradient } (x-1,y) < \text{gradient } (x+1,y) \quad (4)$$

Figure 3:
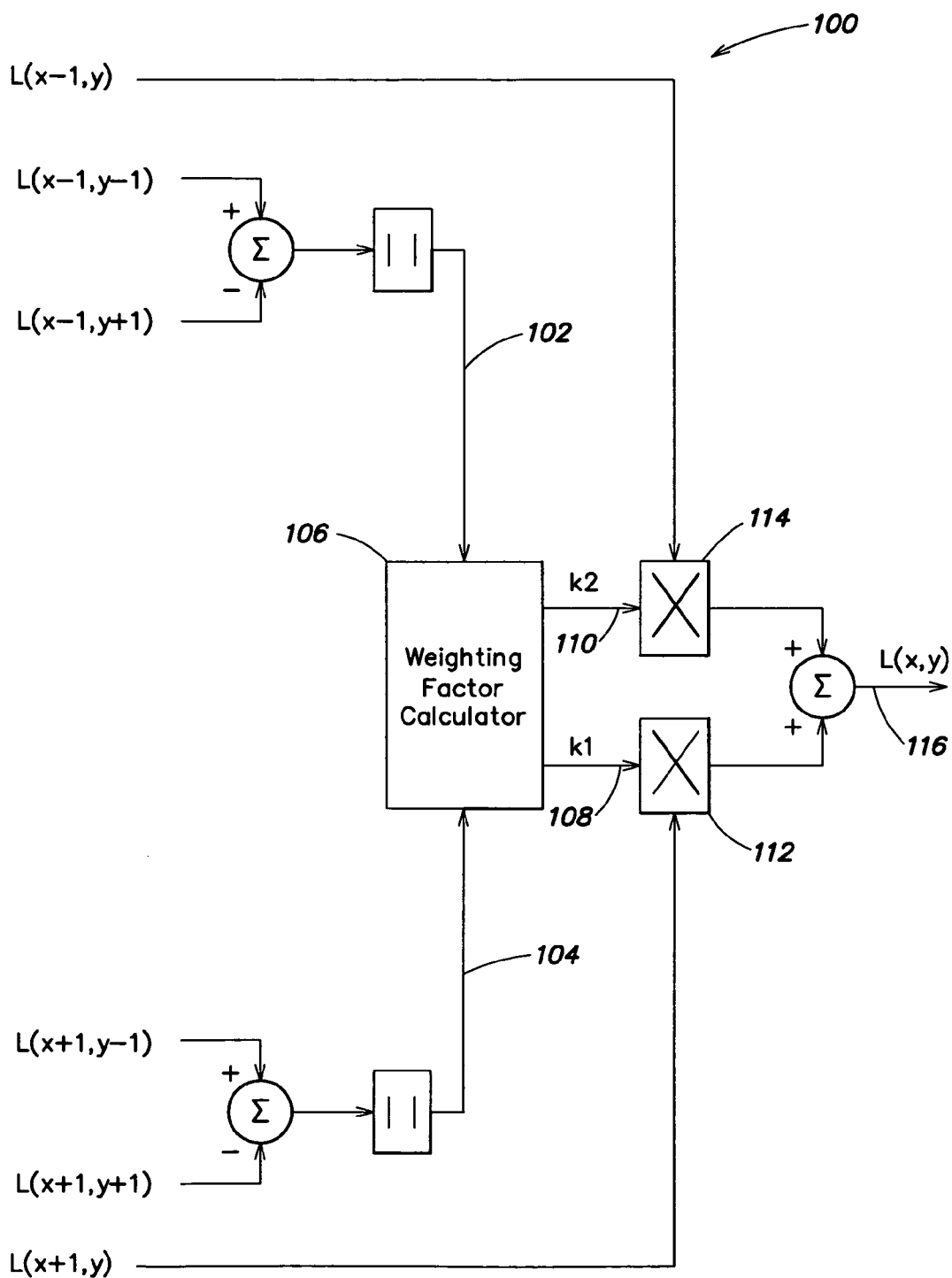
FIG. 3 is a block diagram illustration of a pixel interpolation device.

Equation (3) above does not yet take account of the special case in which the gradients of the two video information values L(x+1,y) are equal in value. In this case, the video information value L(x−1,y) to be interpolated can be generated in a wide variety of ways. In one exemplary embodiment, the average of the first video information value and the average of the second video information value are used as the video information value, so that:

$$L(x,y) = M(x,y) = \tfrac{1}{2}[L(x+1,y) + L(x-1,y)]$$

for the case where gradient $(x-1,y) =$ gradient $(x+1,y)$ \quad (5)

where M(x,y) denotes the average of the pixels P(x+1,y) and P(x−1,y) lying adjacent above and below the pixel P(x,y). FIG. 3 is a block diagram illustration of a pixel interpolation device 100. The device 100 determines the gradients according to EQ. (1), and provides a gradient (x−1, y) signal value on a line 102. Similarly, the device provides a gradient (x+1, y) signal value on a line 104. A weighting factor calculation unit 106 receives the gradient signal values on the lines. 102, 104 and determines the weighting coefficient values k1, k2 on lines 108, 110 respectively. In this embodiment the weighting factor calculation unit 106 determines the weighting coefficient values k1, k2 according to EQs. (4) and (5). The weighting coefficient values k1, k2 are input to multipliers 112, 114 respectively, and the resultant products are summed to provide the signal value L(x,y) on line 116 in accordance with EQ. (3).

In a further embodiment of the invention, besides the first video information value L(x+1,y) and the second video information value L(x−1,y), this average is allowed to flow into the determination of the interpolated video information value, so that the following holds for the interpolated video information value L(x,y):

$$L(x,y)=k11\cdot L(x+1,y)+k21\cdot L(x-1,y)+k31\cdot M(x,y)$$

where $k11+k21+k31=1$ and $0\leq k11, k21, k31\leq 1$ \hfill (6)

In one embodiment, a weighting factor of zero is accorded to the video information value whose associated gradient is larger than the associated gradient of the other video information value, so that:

$$k11=0 \text{ if gradient } (x-1,y)<\text{gradient } (x+1,y)$$

$$k21=0 \text{ if gradient } (x-1,y)>\text{gradient } (x+1,y) \hfill (7)$$

The remaining two weighting factors k31 and k21 or k31 and k11 are preferably chosen such that their relationship depends on the difference between the video information values of the first pixel and the second pixel P(x+1,y), P(x−1,y), the weighting factor k31 of the average M(x,y) decreasing as the difference increases so that as the difference between the video information values L(x+1,y), L(x−1,y) increases, the first or second video information value is more heavily weighted than the average M(x,y). This offers the advantage that vertically running edges are more exactly depicted in the image.

Instead of the average M(x,y), a video information value that was determined for example with a different interpolation method, (e.g., with an interpolation method that also takes account of video information values of a field that temporally follows the field with the intermediate line to be interpolated), can also be used in Equations (5) and (6). In the special case according to Equation (5), this video information value is then taken into account if the gradients at the first and second video information values are zero, and is always taken into account in the case according to Equation (6).

In one embodiment, regardless of whether a further video information value besides the first video information value and the second video information value L(x+1,y), L(x−1,y) is taken into account in the determination of the video information value Lx, a greater weight is accorded to that video information value whose associated gradient is smaller as the absolute value of the difference between the video information values L(x+1,y), L(x−1,y) becomes smaller.

Figure 2:
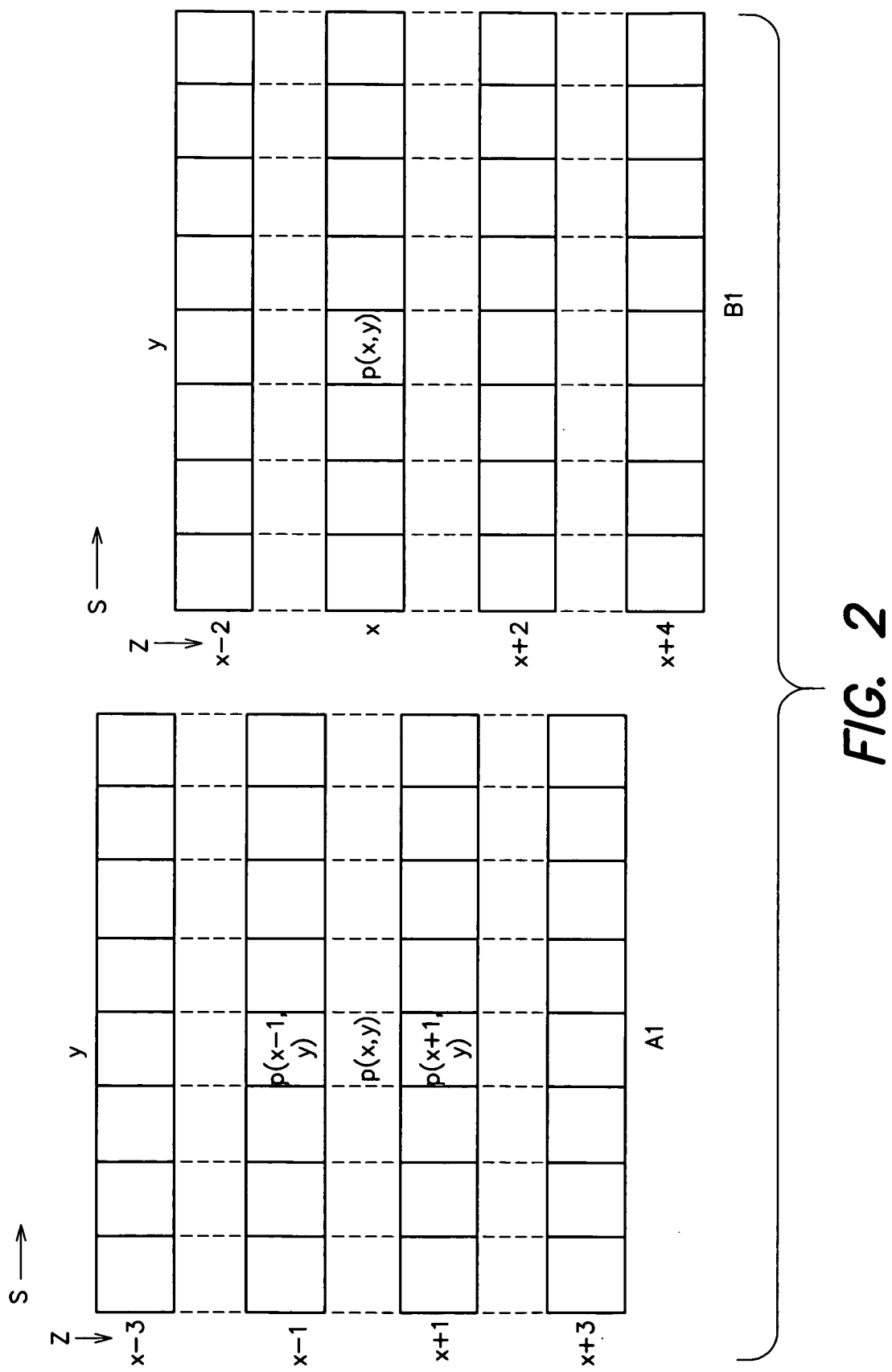
FIG. 2 shows schematically portions of two successive images with interlaced image lines.

FIG. 2 shows schematically portions of two successive fields A1, B1 with interlaced lines, the pixel (x,y) to be interpolated lying in the first field A1. In order to determine a video information value, which is taken into account in the case according to Equation (5) when the gradients of the first and second video information values L(x+1,y), L(x−1,y) are zero or is always taken into account in the case according to Equation (6), a pixel P(x,y) of the second field B1 is employed in this exemplary embodiment, the position of this pixel corresponding to the position of the pixel P(x,y) in the first field A1. This video information value additionally taken into account is determined for example by suitably weighting the video information values of the pixels P(x+1,y) and P(x−1,y) of the first field A1 and the video information value at the pixel P(x,y) in the second field B1 and adding. Furthermore, it is possible to subject these three video information values to median filtering and to use the filter output value as a further video information value in Equations (5) and (6) instead of the average M(x,y).

Even though a simple method for determining a gradient for the video information value of a given pixel has been explained with reference to the exemplary embodiment, it should be noted that any methods that are suitable for determining the gradient of the video information value at a given pixel, and that of course employ more than just two adjacent pixels in the gradient determination can of course be employed.

In one embodiment, the gradient of the video information value at a given pixel is determined by determining the gradient at the given pixel in the fashion explained above and also determining the gradients at at least two adjacent pixels in the fashion explained above and assigning to the given pixel the smallest of the gradient values determined.

Although the present invention has been shown and described with respect to several preferred embodiments thereof, various changes, omissions and additions to the form and detail thereof, may be made therein, without departing from the spirit and scope of the invention.

What is claimed is:

1. A method for the interpolation of a pixel P(x,y) in an image that includes a plurality of pixels arrayed in matrix-like fashion, to each of which a video information value is assigned, the method comprising:

selecting at least a first pixel P(x+1,y) to which a first video information value L(x+1,y) is assigned and a second pixel P(x−1,y) to which a second video information value L(x−1,y) is assigned, wherein, the pixel P(x,y) to be interpolated is located between and adjacent to the first pixel P(x+1,y) and the second pixel P(x−1,y) in an interpolation direction (IR);

determining a gradient of each video information value at the first pixel and the second pixel (P(x+1,y), P(x−1,y)), each in a gradient direction (GR) that deviates from the interpolation direction (IR); and determining a video information value L(x,y) of the pixel P(x,y) to be interpolated, using the first video information value L(x+1,y) and the second video information value L(x−1,y), a greater weight being accorded to the video information value L(x+1,y); L(x−1,y) of the pixel P(x+1,y), P(x−1,y) whose associated gradient is smaller.

2. The method of claim 1, wherein the gradient direction (GR) runs perpendicularly to the interpolation direction (IR).

3. The method of claim 2, wherein, of the first video information value L(x+1,y) and the second video information value L(x−1,y), a weight of unit is accorded to the video information value whose associated gradient is larger while a weight of zero is accorded to the other video information value.

4. The method of claim 3, wherein the average M(x,y) of the first video information value and the second video information value P(x+1,y), P(x−1,y) is selected as the video information value L(x,y) of the pixel P(x,y) to be interpolated if the gradients assigned to the first video information value and the second video information value P(x+1,y), P(x−1,y) are equal.

5. The method of claim 4, wherein the image is a first field resulting from a video signal, the pixel P(x,y) to be interpolated originating from an intermediate line of the field, the first pixel P(x+1,y) originating from a line lying below the intermediate line, and the second pixel P(x−1,y) originating from a line lying above the intermediate line.

6. The method of claim 5, wherein the following video information values are employed in order to determine the video information value of the pixel to be interpolated if the gradients assigned to the first pixel and the second pixel are equal:
the first video information value P(x+1,y);
the second video information value P(x−1,y); and
the video information value of a pixel in a second field succeeding the first field, the position of the pixel of the second field corresponding to the position of the pixel P(x,y) to be interpolated in the first field.

7. The method of claim 6, said step of determining the gradient of the video information value assigned to a given pixel comprises:
taking the difference between the video information value of the given pixel P(x+1,y), P(x−1,y) and of an adjacent pixel P(x+1,y−1), P(x+1,y+1), P(x−1,y−1), P(x−1,y+1); and
taking the absolute value or a positive power of the difference.

8. The method of claim 6, wherein said step of determining the gradient of the video information value assigned to a given pixel P(x+1,y), P(x−1,y) comprises:
taking the difference between the video information value of a first pixel P(x+1,y−1), P(x−1,y−1) adjacent to the given pixel P(x+1,y), P(x−1,y) in the gradient direction and of a second pixel P(x+1,y+1), P(x−1,y+1) adjacent to the given pixel in the gradient direction; and
determining the absolute value or a positive power of the difference.

9. The method of claim 8, wherein the difference between the first video information value and the second video information value L(x+1,y), L(x−1,y) is taken, a smaller weight being accorded to the video information value of the pixel P(x+1,y), P(x−1,y) with the smaller gradient the larger this difference is.

10. An image processing device that determines an interpolation value for an image pixel P(x,y), said device comprising:
a first gradient computation unit that computes a first gradient value in response to pixel values L(x−1, y−1) and L(x−1, y+1);
a second gradient computation unit that computes a second gradient value in response to pixel values L(x+1, y−1) and L(x+1, y+1);
a weighting factor computation unit that computes first and second weighting factors in response to said first and second gradient values, wherein the sum of said first and second weighting factors is constrained to be less than a determined value;
a first multiplier that provides a first product value indicative of the product of said first weighting factor and a pixel value L(x+1,y);
a second multiplier that provides a second product value indicative of the product of said second weighting factor and a pixel value L(x−1,y); and
a summer that sums said first and second product values and provides said interpolation value for the image pixel P(x, y).

11. An image processing device that determines an interpolation value for an image pixel P(x,y), said device comprising:
a first gradient computation unit that computes a first gradient value in response to pixel values L(x−1, y−1) and L(x−1, y+1);
a second gradient computation unit that computes a second gradient value in response to pixel values L(x+1, y−1) and L(x+1 y+1);
a weighting factor computation unit that computes first and second weighting factors in response to said first and second gradient values, wherein the sum of said first and second weighting factors is constrained to be less than a determined value; and
weighting unit that computes said interpolation value for the image pixel P(x, y) in response to said first and second weighting factor and pixel values L(x+1, y) and L(x−1,y).

12. The image processing device of claim 11, wherein said first gradient computation unit computes the absolute value of the difference between said pixel values L(x−1, y−1) and L(x−1, y+1) and said first gradient signal is indicative of said difference value.

13. The image processing device of claim 11, wherein said first gradient computation unit computes the squared value of the difference between said pixel values L(x−1, y−1) and L(x−1, y+1) and said first gradient signal is indicative of said squared value.

* * * * *

UNITED STATES PATENT AND TRADEMARK OFFICE
CERTIFICATE OF CORRECTION

PATENT NO. : 7,092,033 B2 Page 1 of 1
APPLICATION NO. : 10/636307
DATED : August 15, 2006
INVENTOR(S) : Marko Hahn It is certified that error appears in the above-identified patent and that said Letters Patent is hereby corrected as shown below:

Column 3
line 52, after "and" delete "L(x+1, y-1)" and insert --L(x+1, y+1)--

Column 5
line 53, delete "(x,y)" and insert --P(x,y)--

Column 6
In the claims, claim 1, line 45, after "L(x+1,y)" delete ";" and insert --,--
In the claims, claim 3, line 53, delete "unit" and insert --unity--

Column 8
In the claims, claim 11, line 25, delete "L(x+1 y+1);" and insert --L(x+1, y+1);--

Signed and Sealed this

Twenty-first Day of November, 2006

JON W. DUDAS
*Director of the United States Patent and Trademark Office*